(12) United States Patent
Meyers et al.

(10) Patent No.: US 12,306,021 B2
(45) Date of Patent: May 20, 2025

(54) DIGITAL ROD POSITION INDICATION SYSTEM AND METHOD

(71) Applicant: Westinghouse Electric Company LLC, Cranberry Township, PA (US)

(72) Inventors: Timothy S. Meyers, Finleyville, PA (US); Dirk J. Boomgaard, Monroeville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 454 days.

(21) Appl. No.: 17/595,149

(22) PCT Filed: May 8, 2020

(86) PCT No.: PCT/US2020/032115
§ 371 (c)(1),
(2) Date: Nov. 10, 2021

(87) PCT Pub. No.: WO2021/029926
PCT Pub. Date: Feb. 18, 2021

(65) Prior Publication Data
US 2022/0223304 A1    Jul. 14, 2022

Related U.S. Application Data

(60) Provisional application No. 62/846,002, filed on May 10, 2019.

(51) Int. Cl.
*G01D 5/12* (2006.01)
*G21C 7/08* (2006.01)
*G21C 17/12* (2006.01)

(52) U.S. Cl.
CPC ............... *G01D 5/12* (2013.01); *G21C 7/08* (2013.01); *G21C 17/12* (2013.01)

(58) Field of Classification Search
None
See application file for complete search history.

(56) References Cited

U.S. PATENT DOCUMENTS 3,858,191 A * 12/1974 Neuner ............... G21C 17/12
976/DIG. 242
3,890,607 A *  6/1975 Pelenc ............... G21C 17/12
340/870.06

(Continued)

FOREIGN PATENT DOCUMENTS

CN      102411999 A     4/2012
CN      103400615 A    11/2013

(Continued)

OTHER PUBLICATIONS

Search Report for corresponding Russian Application No. 2021135582 Oct. 4, 2023 (English Translation enclosed).

(Continued)

*Primary Examiner* — K. Wong
(74) *Attorney, Agent, or Firm* — K&L Gates LLP

(57) ABSTRACT

A rod position indication system is disclosed. The rod position indication system includes first coils and second coils disposed around a drive rod travel housing in an alternating arrangement, a first data encoder unit connected to each of the first coils and configured to generate a first reference signal, a second data encoder unit connected to the each of the second coils and configured to generate a second reference signal, and a processing circuit in signal communication with the first and second data encoder units. The processing circuit is configured to generate a logic comparison of the first and second reference signals, generate a logic signal based on first position data and second position data, and perform a logic operation on the logic signal and a result of the logic comparison.

20 Claims, 8 Drawing Sheets

(56) References Cited

U.S. PATENT DOCUMENTS

| | | | |
|---|---|---|---|
| 4,629,983 A | | 12/1986 | Boomgard et al. |
| 4,646,012 A | * | 2/1987 | Feilchenfeld .......... G21C 17/12 |
| | | | 976/DIG. 242 |
| 4,855,675 A | * | 8/1989 | Russell .................. G01D 5/206 |
| | | | 324/207.19 |
| 4,964,462 A | * | 10/1990 | Smith ..................... E21B 19/00 |
| | | | 166/66.5 |
| 5,327,078 A | * | 7/1994 | Mori ....................... G01D 5/243 |
| | | | 327/552 |
| 5,841,824 A | * | 11/1998 | Graham ................. G21C 17/00 |
| | | | 376/258 |
| 9,250,277 B1 | * | 2/2016 | Mulhern ............... G01R 25/06 |
| 10,269,460 B2 | | 4/2019 | Butchart |
| 11,508,487 B2 | * | 11/2022 | Chang ..................... G21C 7/12 |
| 2009/0252272 A1 | | 10/2009 | Hashemian et al. |
| 2017/0206990 A1 | | 7/2017 | Carvajal et al. |
| 2018/0298747 A1 | * | 10/2018 | Sanchez Soto ......... E21B 33/06 |

FOREIGN PATENT DOCUMENTS

| | | |
|---|---|---|
| CN | 102411999 B | 8/2014 |
| CN | 106531256 B | 12/2017 |
| GB | 1456029 | 11/1976 |
| GB | 1456029 A | 11/1976 |
| JP | S4997196 A | 9/1974 |
| JP | 2018526620 A | 9/2018 |
| KR | 19930010419 B1 | 10/1993 |
| RU | 2540441 C2 | 2/2015 |
| WO | 2021029926 A2 | 2/2021 |

OTHER PUBLICATIONS

International Search Report and Written Opinion for International PCT Application No. PCT/US2020/032115, dated Feb. 19, 2021.
Search Report for corresponding Taiwan Application No. 109115628, Feb. 23, 2022.

* cited by examiner

DIGITAL ROD POSITION INDICATION SYSTEM AND METHOD

CROSS-REFERENCE TO RELATED APPLICATIONS

This application is a U.S. National Stage Entry under 35 U.S.C. § 371 of International Patent Application No. PCT/US2020/032115, entitled DIGITAL ROD POSITION INDICATION SYSTEM AND METHOD, filed May 8, 2020, which claims the benefit under 35 U.S.C. § 119 (e) of the earlier filing date of U.S. Provisional Patent Application No. 62/846,002 filed on May 10, 2019, the contents of which are hereby incorporated by reference in their entirety.

FIELD

This application discloses an invention which is related, generally and in various aspects, to systems and methods for determining a position of a control rod.

BACKGROUND

In nuclear plants, it is important to know the accurate position of each of the control rods. Control rod drive systems move control rods in increments of steps, with each step being approximately 0.625 inches in most control drive rod systems.

Examples of previously developed digital rod position indication (DRPI) systems are described in U.S. Pat. Nos. 3,893,090 and 3,846,771, the entire contents of each which are hereby incorporated by reference herein.

FIG. 1 illustrates a prior art digital rod position indication (DRPI) system 10 of a nuclear reactor 12. The nuclear reactor 12 includes a reactor pressure vessel 14. Drive rods 16 are structurally coupled to control rods 18. The control rods 18 are surrounded with water 20 which completely fills the pressure vessel 14. Under normal operating conditions, the water 20 is at a high temperature and is pressurized so that no boiling takes place.

The positions of the control rods 18 are determined from measurements taken outside the pressure vessel 14, because no mechanical penetrations of the pressure vessel 14 for purposes of control rod position sensing are permitted. The drive rods 16 move longitudinally within their respective rod travel housings 22, which are sealed pipes which tire formed integral with and extend longitudinally upward from the head 24 of the reactor.

An array 26 of coils 28 placed along a given rod travel housing 22 is utilized to help determine the position of the tip of a given drive rod 16. As it is normally assumed that the fastening of the control rod 18 to its respective drive rod 16 is reliable, the sensed position of the tip of the drive rod 16 is considered to be an accurate indication of the position of the tip of the control rod 18.

FIG. 2 illustrates a cross-section of a single coil 28 of the DRPI system 10 of FIG. 1. The coil 28 is an electrical coil which is wound around the rod travel housing 22. The coil 28 defines a central opening which is partially filled by the rod travel housing 22. An alternating current (AC) of a sufficiently low frequency is established within the individual coils 28 so that the resulting AC flux will penetrate the rod travel housing 22, which is usually constructed of non-magnetic stainless steel. With a sufficiently low frequency, the skin depth of the resulting magnetic flux will be larger than the thickness of the rod travel housing 22, and the AC flux will penetrate all the way through the thickness of the rod travel housing 22 to the interior thereof.

When the drive rod 16 is moved longitudinally through the rod travel housing and passes through the central opening of a given coil 28, the impedance of the coil 28 will change. The drive rod 16 is normally constructed from a ferromagnetic material, such as magnetic stainless steel, so that when the drive rod 16 travels along its axis of movement through the central opening of the coil 28, the impedance of the coil 28 will increase. The change in the impedance of the coil 28 can be measured either by monitoring the current through the coil 28 if the coil 28 is driven from a constant voltage source, or by monitoring the voltage across the coil 28 if the coil 28 is driven from a constant current source. The voltage across the coil 28 can be measured, for example, by measuring a voltage across a sensing resistor which is connected in series with the coil 28. The change in impedance caused by the movement/position of a given drive rod 16 can be utilized to help determine the position of the associated control rod 18. For ease of descriptive purposes hereinafter, the impedance will be described in the context of a measured voltage. However, it can be appreciated that the current, impedance or other parameters can also be utilized to help determine the position of the associated control rod 18.

Referring back to FIG. 1, the coils 28 are provided at 6-step increments along the rod travel housing 22, with each step being approximately 0.625 inches. The coils 28 alternate between A coils and B coils. The A coils are electrically connected to a first data encoder (not shown) and the B coils are electrically connected to a second data encoder (not shown). The first data encoder is structured to determine the difference in the voltages for each adjacent pair of A coils, and determine the largest difference in the voltages. The second data encoder is structured to determine the difference in the voltages for each adjacent pair of B coils, and determine the largest difference in the voltages. For example, when the tip of the drive rod 16 is located in the central opening of one of the A coils, the voltage across that A coil will be different from the voltage across an adjacent A coil for which the drive rod 16 is not located in the central opening thereof. Since the A coils are located 12-steps apart, the difference in the voltages indicates the position of the tip of the drive rod 16 within 12-steps (e.g., somewhere in the rod travel housing 22 between the two A coils). The same process is performed with the B coils. By utilizing the position information from both the A coils and the B coils, the accuracy of the position of the tip of the drive rod 16 can be improved to 6-steps. In other words, the prior art control drive rod system can determine the position of the tip of a drive rod 16 to somewhere in the rod travel housing 22 between an A coil and a B coil, which are located 6-steps apart.

There is room for improvement in digital rod position indication systems.

BRIEF DESCRIPTION OF THE DRAWINGS

The novel features of the aspects described herein are set forth with particularity in the appended claims. The aspects, however, both as to organization and methods of operation may be better understood by reference to the following description, taken in conjunction with the accompanying drawings.

DETAILED DESCRIPTION

Figure 1:
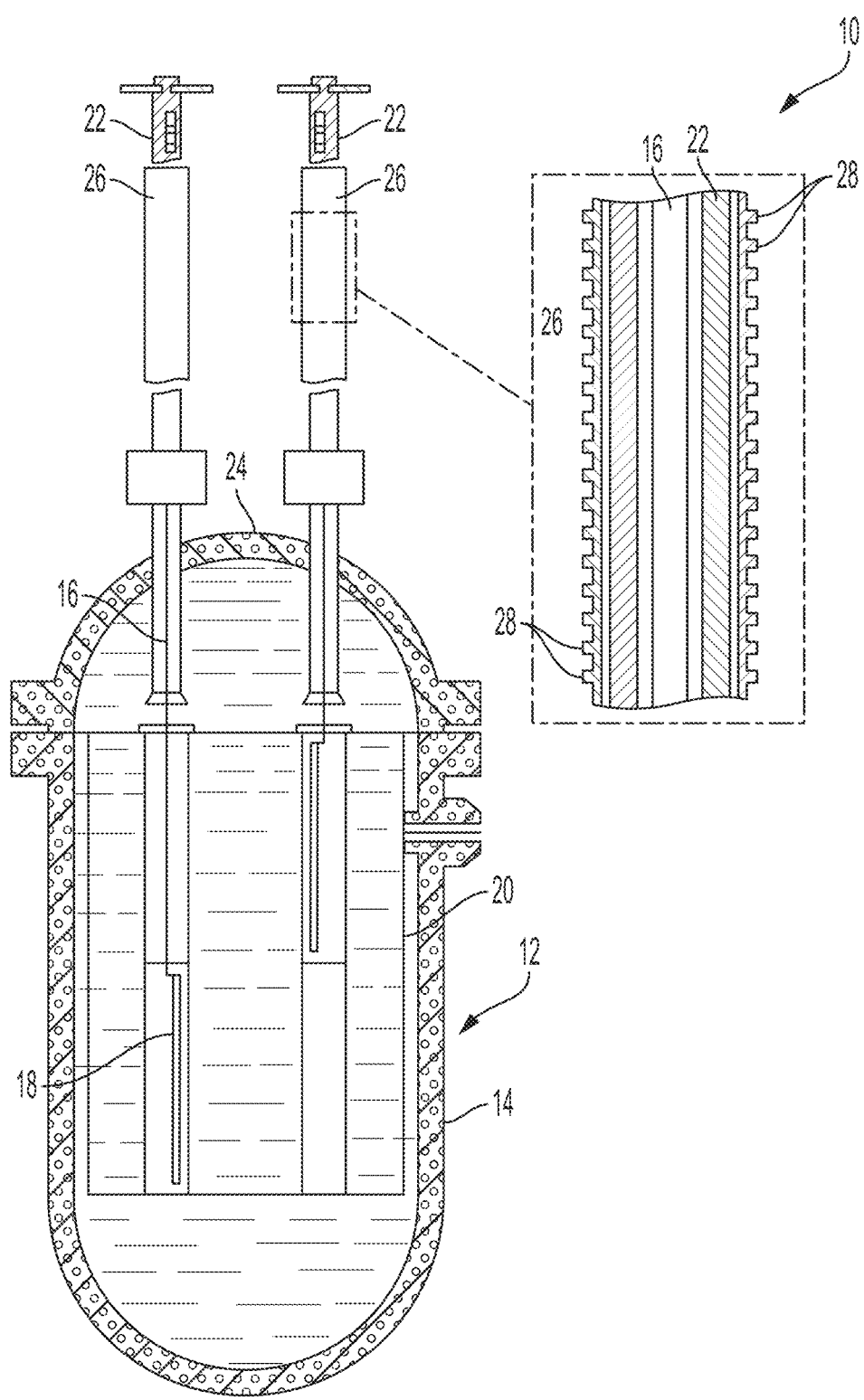
FIG. 1 illustrates a prior art control drive rod system of a nuclear reactor.
Figure 2:
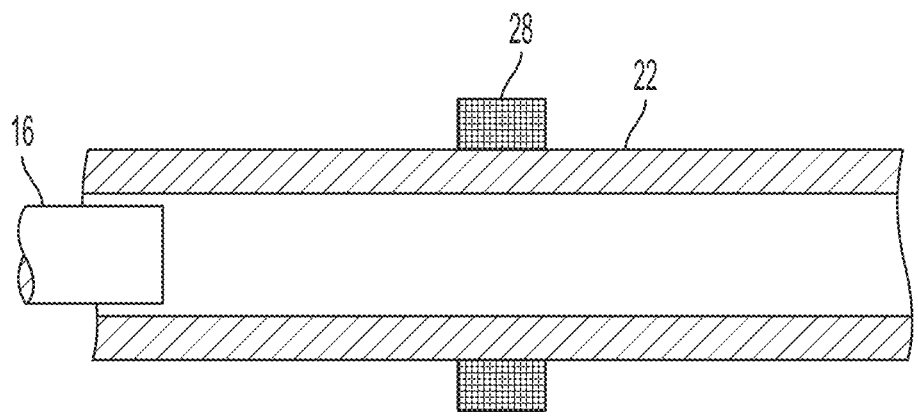
FIG. 2 illustrates a cross-section of a single coil of the control drive rod system of FIG. 1.

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

In the following detailed description, reference is made to the accompanying drawings, which form a part hereof. In the drawings, similar symbols and reference characters typically identify similar components throughout several views, unless context dictates otherwise. The illustrative aspects described in the detailed description, drawings and claims are not meant to be limiting. Other aspects may be utilized, and other changes may be made, without departing from the scope of the technology described herein.

The following description of certain examples of the technology should not be used to limit its scope. Other examples, features, aspects, embodiments and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, aspects, embodiments, examples, etc. described herein may be combined with any one or more of the other teachings, expressions, aspects, embodiments, examples, etc. that are described herein. The following described teachings, expressions, aspects, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Before explaining the various aspects of the rod position indication system in detail, it should be noted that the various aspects disclosed herein are not limited in their application or use to the details of construction and arrangement of parts illustrated in the accompanying drawings and description. Rather, the disclosed aspects may be positioned or incorporated in other aspects, embodiments, variations and modifications thereof, and may be practiced or carried out in various ways. Accordingly, aspects of the rod position indication system disclosed herein are illustrative in nature and are not meant to limit the scope or application thereof. Furthermore, unless otherwise indicated, the terms and expressions employed herein have been chosen for the purpose of describing the aspects for the convenience of the reader and are not meant to limit the scope thereof. In addition, it should be understood that any one or more of the disclosed aspects, expressions of aspects, and/or examples thereof, can be combined with any one or more of the other disclosed aspects, expressions of aspects, and/or examples thereof, without limitation.

Also, in the following description, it is to be understood that terms such as inward, outward, upward, downward, above, top, below, floor, left, right, side, interior, exterior and the like are words of convenience and are not to be construed as limiting terms. Terminology used herein is not meant to be limiting insofar as devices described herein, or portions thereof, may be attached or utilized in other orientations. The various aspects will be described in more detail with reference to the drawings.

Figure 3A:
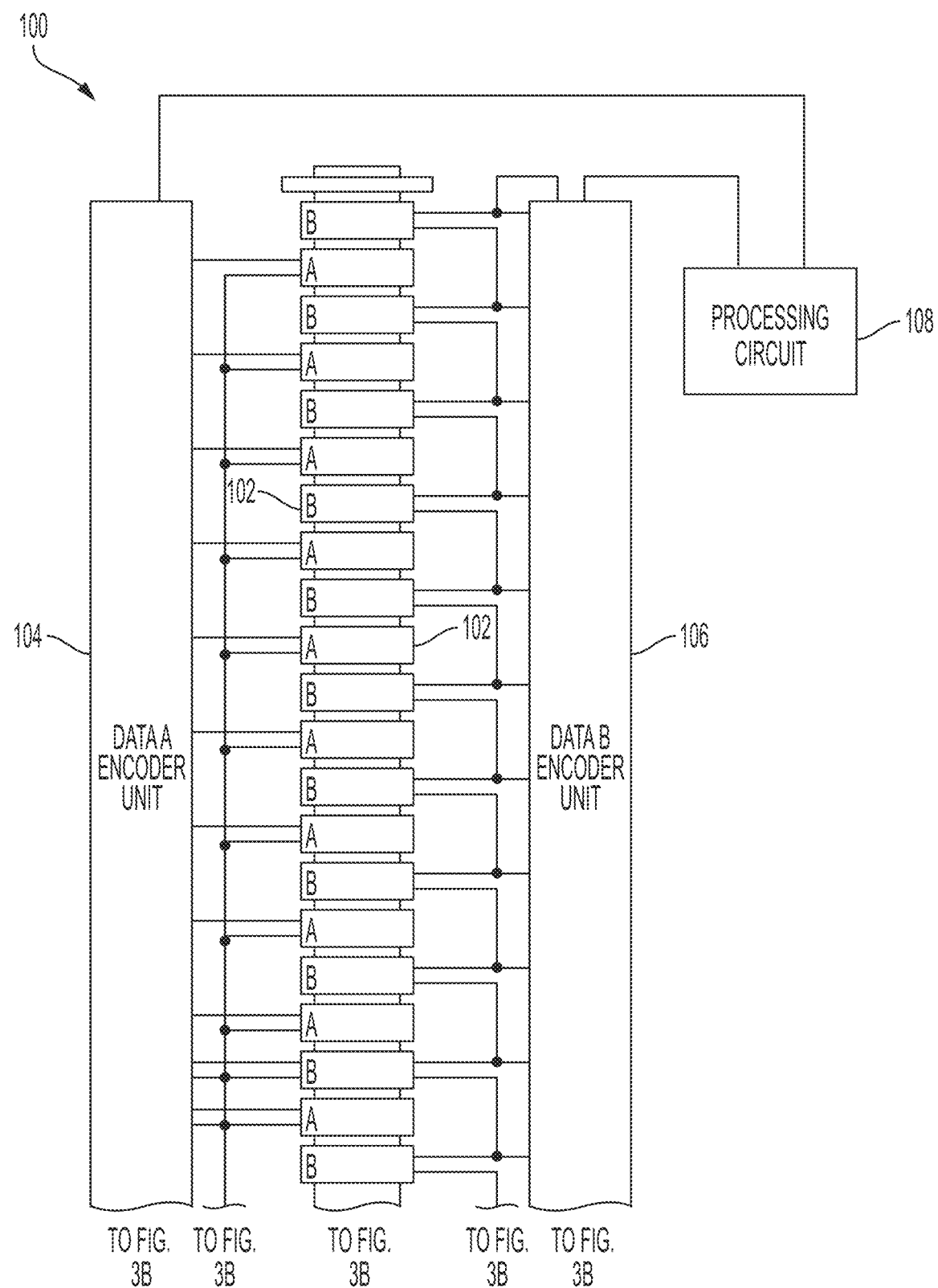
FIGS. 3A and 3B collectively illustrate a digital rod position indication system, in accordance with at least one aspect of the present disclosure.
Figure 3B:
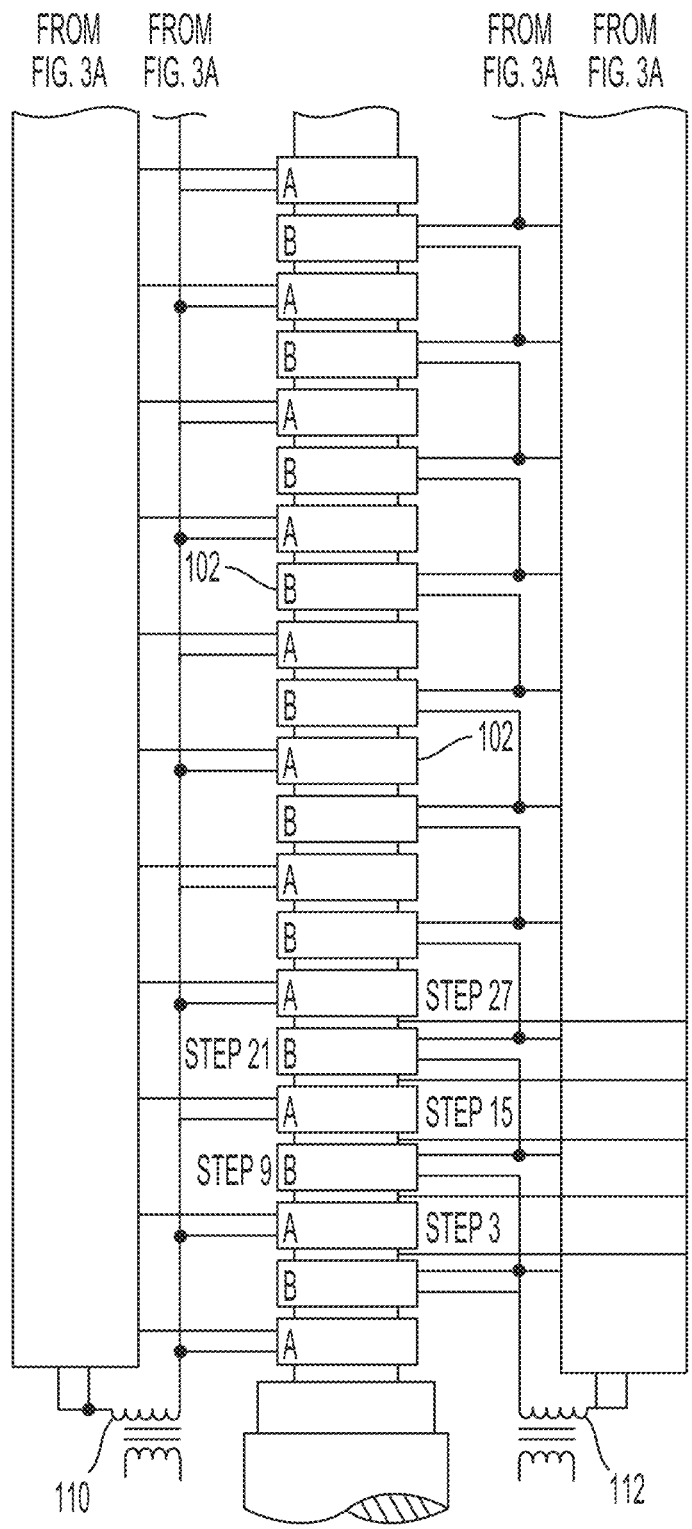

FIGS. 3A and 3B collectively illustrate a digital rod position indication (DRPI) system 100, in accordance with at least one aspect of the present disclosure. The DRPI system 100 is similar to the DRPI system 10, but is different in that the DRPI system 100 improves the determined accuracy of the position of the tip of the drive rod from 6-step accuracy to 3-step accuracy. The DRPI system includes a plurality of coils 102, a first encoder unit 104 (data A encoder unit), a second encoder unit 106 (data B encoder unit) and a processing circuit 108.

The plurality of coils 102 are arranged as alternating A coils and B coils, disposed around a drive rod travel housing in a manner similar to the coils 28 of the DPRI 10. Each coil is spaced the same distance apart from its adjacent coils along a length of the drive rod travel housing. Each of the A coils is connected in parallel to a first AC power source 110 which can be positioned in a data A cabinet (not shown) located inside the containment. The respective outputs of each of the A coils are connected to the data A encoder unit 104. Each of the B coils is connected in parallel to a second AC power source 120 which can be positioned in a data B cabinet (not shown) located inside the containment. The respective outputs of each of the B coils are connected to the data B encoder unit 104.

The data A encoder unit 104 is configured to determine the difference in the voltages of each adjacent pair of A coils, and determine the largest difference in the voltages. For example, according to various aspects, the data A encoder unit 104 may utilize sensing resistors to measure the voltages across the individual A coils, and differential amplifiers or other devices, logic or circuitry to determine the difference in the voltages of each adjacent pair of A coils and the largest difference in the voltages of each adjacent pair of A coils. As set forth above, when taken alone, this largest difference in the voltages of adjacent A-coils indicates the position of the tip of the drive rod within 12-steps (e.g., somewhere in the rod travel housing between the two A coils).

Each of the spaces between two adjacent A coils can be represented by a unique five-bit gray code. For example, the space between a first A coil and a second A coil can be represented in gray code by 00001, the space between the second A coil and a third A coil can be represented in grade code by 00011, the space between the third A coil and a fourth A coil can be represented in grade code by 00111 and so forth. The data A encoder unit 104 is also configured to generate a five-bit gray code which is representative of the space between the two adjacent A coils deter mined to have the largest difference in voltages. In other words, as the space is representative of the position of the tip of the drive rod (within 12-steps), the five-bit gray code generated by the data A encoder unit 104 is representative of the position of the tip of the drive rod, and by logical extension, the position of the control rod. The five-bit gray code generated by the data A encoder unit 104 is also known as rod position data A.

The data A encoder unit 104 is further configured to generate a reference signal (reference signal A) based on the determined largest difference in the voltages of adjacent A-coils. The reference signal A is the rectified largest difference in the voltages of adjacent A-coils, and is representative of the magnitude of the difference. By utilizing the rectified largest difference, reference signal A will always have a positive value. The five-bit gray code generated by the data A encoder unit 104 and the reference signal A generated by the data A encoder unit 104 are forwarded to the processing circuit 108 on a periodic or continuous basis. According to various aspects, the functionality of the data A encoder unit 104 may be realized by one or more cards or printed circuit boards which can include integrated and/or discrete hardware elements, software elements, and/or a combination of both.

The data B encoder unit 106 is configured to determine the difference in the voltages of each adjacent pair of B coils, and determine the largest difference in the voltages. For example, according to various aspects, the data B encoder unit 106 may utilize sensing resistors to measure the voltages across the individual B coils, and differential amplifiers or other devices, logic or circuitry to determine the difference in the voltages of each adjacent pair of B coils and the largest difference in the voltages of each adjacent pair of B coils. As set forth above, when taken alone, this largest difference in the voltages of adjacent B-coils indicates the position of the tip of the drive rod within 12-steps (e.g., somewhere in the rod travel housing between the two B coils).

Each of the spaces between two adjacent B coils can be represented by a unique five-bit gray code. For example, the space between a first B coil and a second B coil can be represented in gray code by 00001, the space between the second B coil and a third B coil can be represented in grade code by 00011, the space between the third B coil and a fourth B coil can be represented in grade code by 00111 and so forth. The data B encoder unit 106 is also configured to generate a five-bit gray code which is representative of the space between the two adjacent B coils determined to have the largest difference in voltages. In other words, as the space is representative of the position of the tip of the drive rod (within 12-steps), the five-bit gray code generated by the data B encoder unit 106 is representative of the position of the tip of the drive rod, and by logical extension, the position of the control rod. The five-bit gray code generated by the data B encoder unit 106 is also known as rod position data B.

The data B encoder unit 106 is further configured to generate a reference signal (reference signal B) based on the determined largest difference in the voltages of adjacent B coils. The reference signal B is the rectified largest difference in the voltages of adjacent B coils, and is representative of the magnitude of the difference. By utilizing the rectified largest difference, reference signal B will always have a positive value, and any comparison between reference signal A and reference signal B will not be affected by the polarity of the measured voltages. The five-bit gray code generated by the data B encoder unit 106 and the reference signal B generated by the data B encoder unit 106 are forwarded to the processing circuit 108 on a periodic or continuous basis. According to various aspects, the functionality of the data B encoder unit 106 may be realized by one or more cards or printed circuit boards which can include integrated and/or discrete hardware elements, software elements, and/or a combination of both.

As the drive rod travels up and down, the voltages across the various coils 102 increase and decrease. For example, the voltage drop across a given coil 102 increases as the tip of the drive rod passes through the central opening of the coil 102 and decreases when the drive rod is no longer in the central opening of the coil 102. Thus, the voltage difference between adjacent coils is highest is when the tip of drive rod is passing through the central opening of one of the coils 102 and the drive rod is not in the central opening of the adjacent coil 102.

As the differences in the voltages across adjacent coils 102 changes as the drive rod travels up and down, the values of reference signal A and reference signal B also increase and decrease as the drive rod travels up and down. Due to the alternating arrangement of the A coils and the B coils, when reference signal A is at its highest voltage, reference signal B is at its lowest voltage. Similarly, when reference signal A is at its lowest voltage, reference signal B is at its highest voltage. When reference signal A is greater than reference signal B, it is an indication that the tip of the drive rod is closer to an A coil than it is to a B coil. When reference signal A is equal to reference signal B, it is an indication that the tip of the drive rod is equidistant between an A coil and a B coil. When reference signal A is less than reference signal B, it is an indication that the tip of the drive rod is closer to a B coil than it is to an A coil.

The processing circuit 108 is positioned outside the containment and is electrically connected to (in signal communication with) the data A encoder unit 104 and the data B encoder unit 106. The processing circuit 108 is configured to utilize the gray code and the reference signal A received from the data A encoder unit 104 and the gray code and the reference signal B received from the data B encoder unit 106 to determine the position of the tip of the drive rod, and by extension, the position of the control rod, with 3-step accuracy. The processing circuit 108 may also generate information regarding the determined position of the control rod and format the information so that the information can be displayed on a monitor (not shown) connected to the processing circuit 108.

The processing circuit 108 may be implemented using integrated and/or discrete hardware elements, software elements, and/or a combination of both. Examples of integrated hardware elements may include processors, microprocessors, microcontrollers, integrated circuits, ASICs, PLDs, DSPs, FPGAs, logic gates, registers, semiconductor devices, chips, microchips, chip sets, microcontrollers, SoC, and/or SIP. Examples of discrete hardware elements may include circuits and/or circuit elements such as logic gates, field effect transistors, bipolar transistors, resistors, capacitors, inductors, and/or relays. In certain instances, the processing circuit 108 may include a hybrid circuit comprising discrete and integrated circuit elements or components on one or more substrates, for example.

FIGS. 4A-4D illustrate representations of various signals, logic comparisons, logic signals and results of logical operations utilized by the DRPI system 100 to determine the position of the control rod with 3-step accuracy, in accordance with at least one aspect of the present disclosure.

Figure 4A:
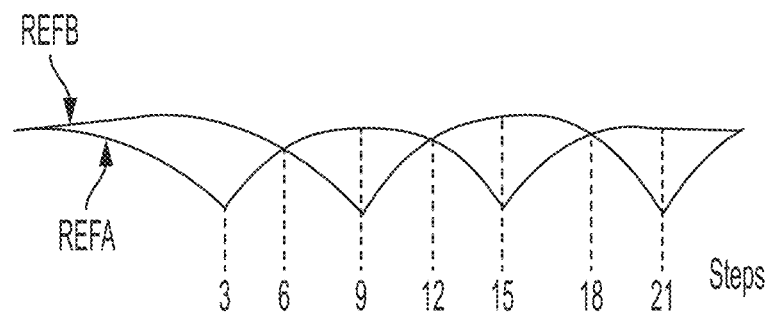
FIG. 4A illustrates a graph which shows the magnitude of reference signal A and the magnitude of reference signal B as a rod moves, in accordance with at least one aspect of the present disclosure.

FIG. 4A illustrates a graph which shows the magnitude of the reference signal A and the magnitude of the reference signal B as the drive rod moves through the steps, in accordance with at least one aspect of the present disclosure. According to various aspects, the respective magnitudes are determined by the data A encoder unit 104 and the data B encoder unit 106. As shown in FIG. 4A, when the tip of the drive rod reaches step 6, the magnitude of the reference signal B is decreasing, the magnitude of the reference signal A is increasing, and the magnitude of the reference signal A becomes greater than the magnitude of the reference signal B shortly thereafter. As the drive rod continues moving and the tip of the drive rod reaches step 12, the magnitude of the reference signal A is decreasing, the magnitude of the reference signal B is increasing, and the magnitude of the reference signal B becomes greater than the magnitude of the reference signal A shortly thereafter. The pattern shown in FIG. 4A repeats itself as the drive rod continues to move.

Figure 4B:
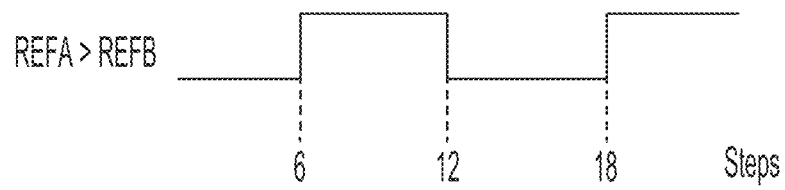
FIG. 4B illustrates a graph of a logic comparison of reference signal A and reference signal B as the rod moves, in accordance with at least one aspect of the present disclosure.

FIG. 4B illustrates a graph of a logic comparison of reference signal A and reference signal B as the drive rod moves through the steps, in accordance with at least one aspect of the present disclosure. According to various aspects, the logic comparison is made by the processing circuit 108. For the logic comparison of FIG. 4B, the processing circuit 108 generates a high signal when the reference signal A is greater than the reference signal B. For example, the processing circuit 108 generates a high signal while the magnitude of reference signal A is higher than the magnitude reference signal B (i.e., from step 6 to step 12, and from step 18 to step 24). The processing circuit 108 generates a low signal while the magnitude of reference signal A is lower than the magnitude reference signal B (i.e., from step 12 to step 18). The pattern shown in FIG. 4B repeats itself as the drive rod continues to move. According to other aspects, the processing circuit 108 may generate a high signal when the reference signal B is greater than the reference signal A. The logic comparison of reference signal A and reference signal B reflected in FIG. 4B indicates the tip of the drive rod is closer to an A coil from step 6 to step 12, closer to a B coil from step 12 to step 18, closer to another A coil from step 18 to step 24 and so on, which is only 6-step accuracy.

Figure 4C:
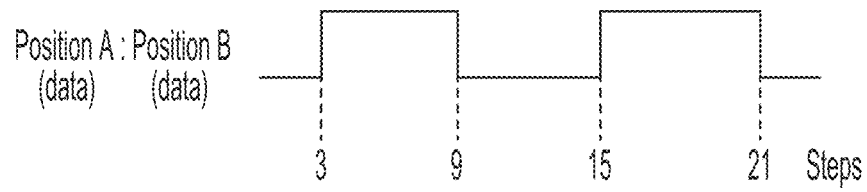
FIG. 4C illustrates a graph of a logic signal associated with the rod position data A and the rod position data B as the rod moves, in accordance with at least one aspect of the present disclosure.

FIG. 4C illustrates a graph of a logic signal associated with the rod position data A and the rod position data B as the drive rod moves through the steps, in accordance with at least one aspect of the present disclosure. As the logic signal is representative of the position of the tip of the drive rod relative to an A coil and a B coil, the logic signal may be considered a position signal. According to various aspects, the logic signal is generated by the processing circuit 108. For the logic signal of FIG. 4C, the processing circuit 108 generates a high signal when the value of the gray code associated with the data A encoder unit 104 changes, and maintains the high signal until the value of the gray code associated with the data B encoder unit 106 changes. Stated differently, the processing circuit 108 generates a low signal when the value of the gray code associated with the data B encoder unit 106 changes, and maintains the low signal until the value of the gray code associated with the data A encoder unit 104 changes. For the example shown in FIG. 4C, the logic signal is high from step 3 to step 9, is low from step 9 to step 15, is high again from step 15 to step 21 and so on. The pattern shown in FIG. 4C repeats itself as the drive rod continues to move. The logic signal of FIG. 4C reflects the output of prior DRPI systems such as, for example, DRPI system 10, and only provides 6-step accuracy. However, by performing an exclusive or (XOR) operation of the logic comparison of FIG. 4B and the logic signal of FIG. 4C, the result is 3-step accuracy (e.g., the tip of the drive rod is between an A coil and a B coil, but is closer to the A coil).

Figure 4D:
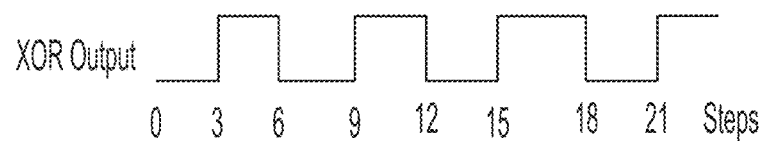
FIG. 4D illustrates a graph of a result of performing an exclusive or (XOR) logic operation, in accordance with at least one aspect of the present disclosure.

FIG. 4D illustrates a graph of a result of performing an exclusive or (XOR) logic operation on the logic comparison of FIG. 4B and the logic signal of FIG. 4C, in accordance with at least one aspect of the present disclosure. According to various aspects, the XOR logic operation is performed by the processing circuit 108. The result of the XOR logic operation provides an indication of where the tip of the drive rod is, and by extension, the position of the control rod, with 3-step accuracy. For example, as the drive rod moves through the steps, the result of the XOR logic operation is a high signal from step 3 to step 6, which indicates that the tip of the drive rod is between an A coil and a B coil but is closer to the B coil, thus providing 3-step accuracy. As the drive rod continues moving through the steps, the result of the XOR logic operation is a low signal from step 6 to step 9, which indicates that the tip of the drive rod is between an A coil and a B coil but is closer to the A coil. The pattern of alternating between high and low every 3-steps repeats itself as the drive rod continues to move.

In view of the above, it will be appreciated that the DRPI system 100 is able to utilize many of the components of prior art systems such as the DRPI system 10. The reuse of many components already present in existing nuclear reactors allows the DRPI system 100 and the 3-step accuracy it provides to be implemented with minimal installation effort at existing nuclear reactors. Of course, the DRPI system 100 can also be utilized for new nuclear reactors.

Figure 5:
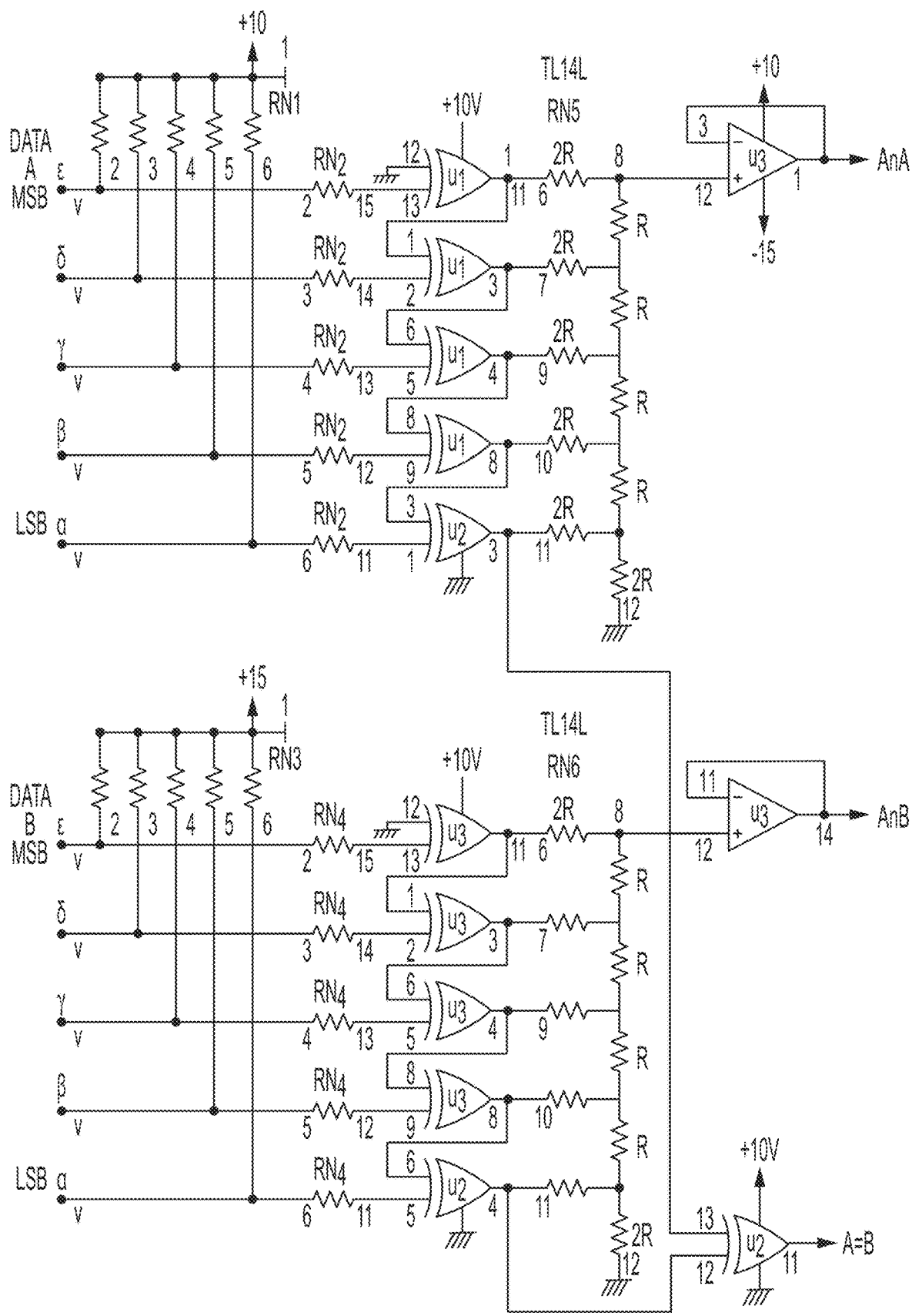
FIG. 5 illustrates an exemplary circuit for determining when rod position data A and the rod position data B are equal, in accordance with at least one aspect of the present disclosure.

FIG. 5 illustrates an exemplary circuit for determining when the respective five-bit gray codes associated with the rod position data A and the rod position data B are equal, in accordance with at least one aspect of the present disclosure. For the exemplary circuit of FIG. 5, all of the bits of the rod position data A are added together to get a checksum, and all of the bits of the rod position data B are added together to get a checksum. The respective checksums can then be compared to determine when the respective five-bit gray codes associated with the rod position data A and the rod position data B are equal. It will be appreciated that the circuit of FIG. 5 is merely exemplary and that other components, devices and/or circuits may be utilized to provide the same functionality.

Figure 6:
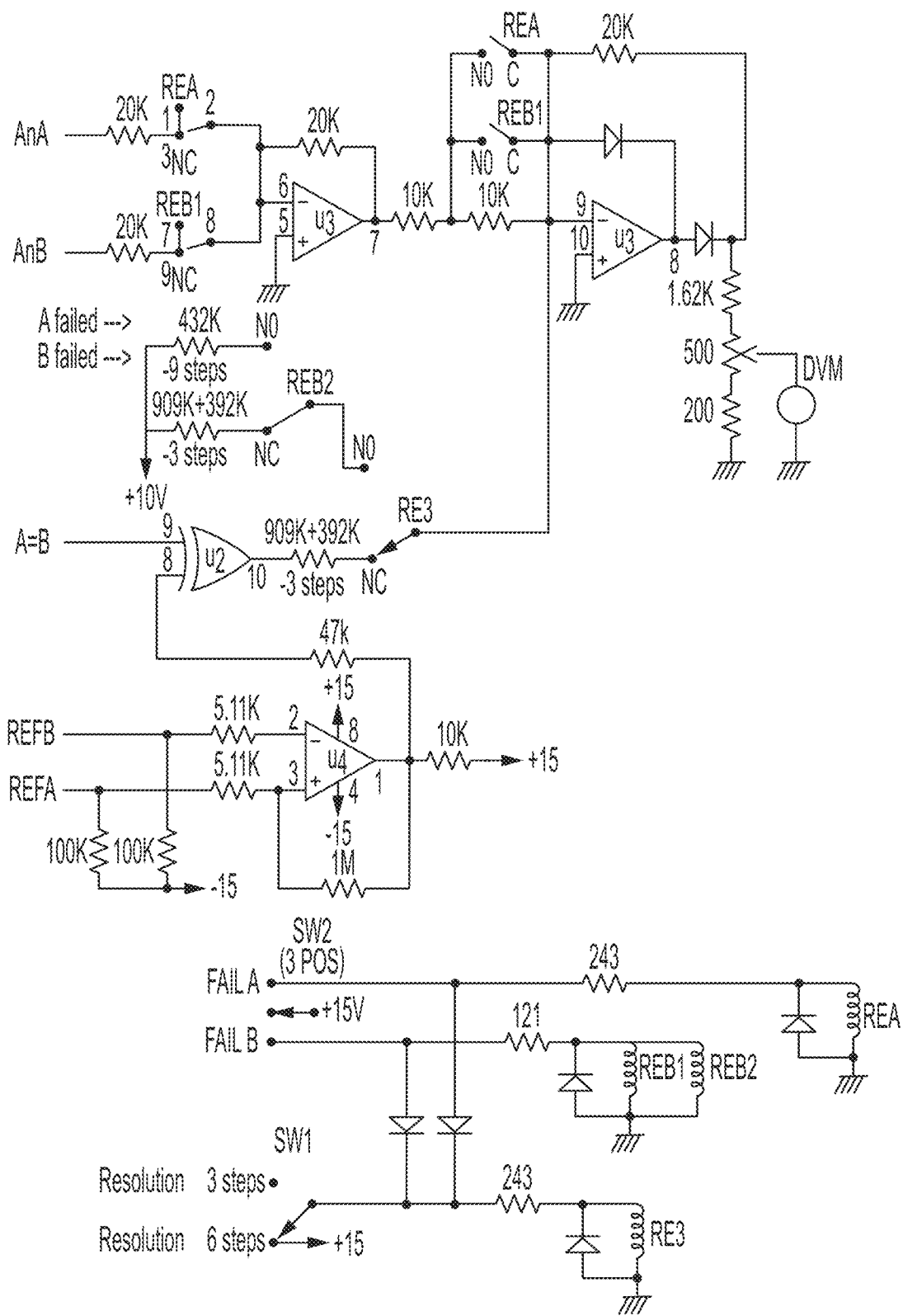
FIG. 6 illustrates an exemplary circuit for performing an exclusive or (XOR) logic operation on the logic comparison of FIG. 4B and the logic signal of FIG. 4C, in accordance with at least one aspect of the present disclosure.

FIG. 6 illustrates an exemplary circuit for performing the exclusive or (XOR) logic operation on the logic comparison of FIG. 4B and the logic signal of FIG. 4C, in accordance with at least one aspect of the present disclosure. For the exemplary circuit of FIG. 6, the comparator $U_4$ compares the reference signal to the reference signal B and outputs a high signal if the reference signal A is greater than the reference signal B. If the reference signal A is less than the reference signal B, the comparator $U_4$ outputs a low signal. In either case, the outputted signal is input to the XOR gate $U_2$. The rod position data A=rod position data B signal (A=B) is also input to the XOR gate $U_2$. This signal can be provided, for example, by the exemplary circuit of FIG. 5. If the rod position data A=rod position data B signal is high, that implies the drive rod is equidistant from an A coil and a B coil. If the rod position data A=rod position data B signal is low (A does not equal B), that implies that the drive rod is somewhere between an A coil and a B coil. The output of the XOR gate $U_2$, an example of which is shown in FIG. 4D, provides 3-step accuracy (e.g., the drive rod is between an A coil and a B coil, but is closer to the A coil).

As shown in the exemplary circuit of FIG. 6, if there is a failure on either the A-side (in either an A coil or in the data A encoder unit 104) or the B side (in either a B coil or in the data B encoder unit 106), the DRPI system 100 can still operate with 6-step accuracy. It will be appreciated that the circuit of FIG. 6 is merely exemplary and that other components, devices and/or circuits may be utilized to provide the same functionality.

According to various aspects, some of the described functionality may be performed by components other than as described above. For example, in some aspects, the data A encoder unit 104 and the data B encoder unit 106 may perform the XOR operation and output the signal shown in FIG. 4D indicating the position of the tip of the drive rod with 3-step accuracy. Such aspects can be realized by modifying one or more of the cards in the data A encoder unit 104 and one or more of the cards in the data B encoder unit 106, or by replacing one or more of the cards in the data A encoder unit 104 and one or more of the cards in the data B encoder unit 106 with new cards. According to other aspects, the data A encoder unit 104 and the data B encoder unit 106 may be omitted and the outputs of the coils 102 may be provided to the processing circuit 108 which may then determine the largest differences between the voltages of each adjacent pair of A coils and the largest differences between the voltages of each adjacent pair of B coils, generate the reference signal A and the reference signal B, and perform the XOR operation in hardware, software, or any combination thereof.

Figure 7:
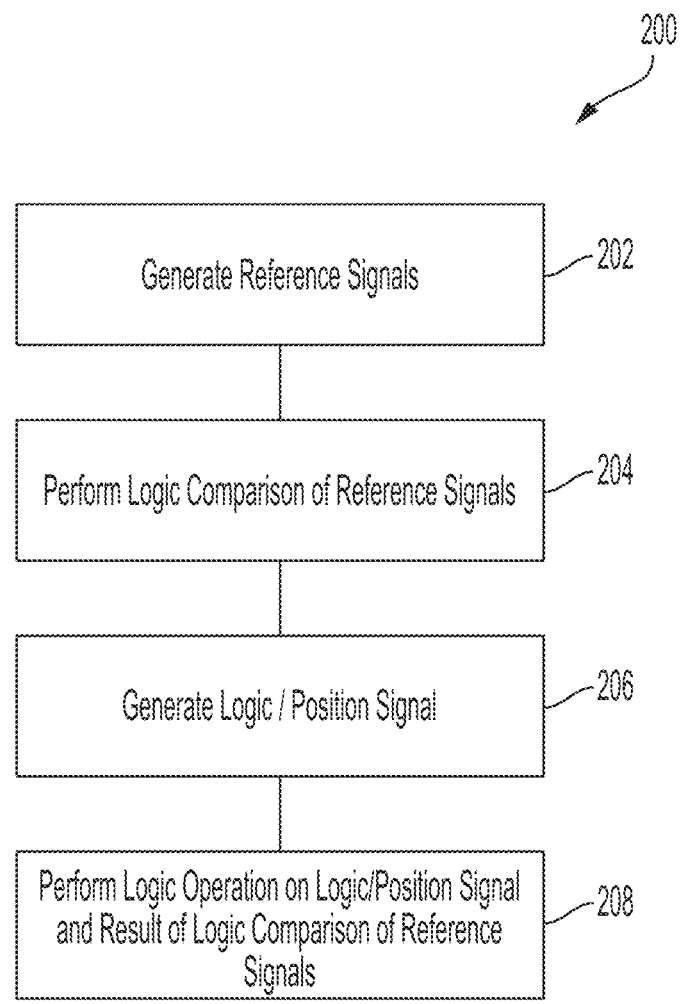
FIG. 7 illustrates a method 200 of determining a position of the tip of the drive rod with 3-step accuracy, in accordance with at least one aspect of the present disclosure.

FIG. 7 illustrates a method 200 of determining a position of the tip of the drive rod with 3-step accuracy, in accordance with at least one aspect of the present disclosure. Although the method 200 is described in the context of determining a position of the tip of the drive rod with 3-step accuracy, it will be appreciated that the method 200 may be utilized to calibrate any number of different "step" systems. The method 200 may be implemented using the DRPI system 100 or other similar systems. For purposes of simplicity, the implementation of the method 200 will be described in the context of the DRPI system 100.

For the method 200, a reference A signal and a reference B signal are generated 202 respectively by the data A encoder unit 104 and the data B encoder unit 106. The generation of the reference A signal and the reference B signal may include measuring voltages across the coils 102, determining the largest voltage differences of each pair of adjacent A coils and of each pair of adjacent B coils, and rectifying the largest voltage differences to generate the reference A signal and the reference B signal. Examples of the reference A signal and the reference B signal are shown in FIG. 4A.

The processing circuit 108 performs 204 a logic comparison of the reference signal A and the reference signal B. An example of a result of the logic comparison is shown graphically in FIG. 4B, where the result is a high signal when the reference signal A is greater than the reference signal B.

The processing circuit 108 generates 206 a logic/position signal based on the rod position data A and rod position data B respectively generated by the data A encoder unit 104 and the data B encoder unit 106. The generation of the logic/position signal 206 may include the generation of the rod position data A and the rod position data B by the data A encoder unit 104 and the data B encoder unit 106, as well as the processing of the gray code associated with the rod position data A and rod position data B by the processing circuit 108. An example of the logic/position signal is shown in FIG. 4C.

The processing circuit 108 performs 208 an exclusive or (XOR) operation on (1) the result of the logic comparison of the reference signal A and the reference signal B and (2) the logic/position signal. An example of the result of the XOR operation is shown in FIG. 4D. As previously described, the result of the XOR operation provides an indication of the position of the tip of the drive rod, and by extension, the position of the control rod with 3-step accuracy.

EXAMPLES

Example 1—A rod position indication system is provided. The rod position indication system comprises first coils and second coils disposed around a drive rod travel housing in an alternating arrangement, a first data encoder unit connected to each of the first coils and configured to generate a first reference signal, a second data encoder unit connected to the each of the second coils and configured to generate a second reference signal, and a processing circuit in signal communication with the first and second data encoder units. The processing circuit is configured to generate a logic comparison of the first and second reference signals, generate a logic signal based on first position data and second position data, and perform a logic operation on the logic signal and a result of the logic comparison.

Example 2—The rod position indication system of Example 1, wherein the first data encoder unit is further configured determine which adjacent pair of the first coils has a largest difference of respective voltages across them.

Example 3—The rod position indication system of Example 2, wherein the first reference signal is a rectification of the largest difference of respective voltages associated with the first coils.

Example 4—The rod position indication system of Examples 1, 2 or 3, wherein the first data encoder unit is further configured to generate the first position data.

Example 5—The rod position indication system of Examples 1, 2, 3 or 4, wherein the second data encoder unit is further configured determine which adjacent pair of the second coils has a largest difference of respective voltages across them.

Example 6—The rod position indication system of Example 5, wherein the second reference signal is a rectification of the largest difference of respective voltages associated with the second coils.

Example 7—The rod position indication system of Examples 1, 2, 3, 4, 5 or 6, wherein the first data encoder unit is further configured to generate the first position data.

Example 8—The rod position indication system of Examples 1, 2, 3, 4, 5, 6 or 7, wherein the processing circuit is further configured to generate a result of the logic comparison, wherein the result comprises (1) a first value when the first reference signal is greater than the second reference signal and (2) a second value when the first reference signal is less than the second reference signal.

Example 9—The rod position indication system of Examples 1, 2, 3, 4, 5, 6, 7 or 8, wherein the logic operation comprises an exclusive or logic operation.

Example 10—The rod position indication system of Examples 1, 2, 3, 4, 5, 6, 7, 8 or 9, wherein the processing circuit is further configured to generate a result of the logic operation, wherein the result comprises a representation of a position of a rod with 3-step accuracy.

Example 11—A method is provided. The method comprises generating a first reference signal and a second reference signal, performing a logic comparison of the first and second reference signals, generating a position signal and performing a logic operation on the position signal and a result of the logic comparison, wherein a result of the logic operation comprises a representation of a position of a rod with 3-step accuracy.

Example 12—The method of Example 11, wherein generating the first and second reference signal comprises (1) measuring respective voltages across individual first coils and (2) measuring respective voltages across individual second coils, wherein the first coils and the second coils are disposed around a drive rod travel housing in an alternating arrangement.

Example 13—The method of Examples 11 or 12, wherein generating the first and second reference signals comprises (1) determining which adjacent pair of first coils has a largest difference of respective voltages across them and (2) determining which adjacent pair of second coils has a largest difference of respective voltages across them, wherein the first coils and the second coils are disposed around a drive rod travel housing in an alternating arrangement.

Example 14—The method of Examples 11, 12 or 13, wherein generating the first and second reference signals further comprises (1) rectifying the largest difference of respective voltages associated with the first coils and (2) rectifying the largest difference of respective voltages associated with the second coils.

Example 15—The method of Examples 11, 13 or 14, further comprising generating a result of the logic comparison, wherein the result of the logic comparison comprises (1) a first value when the first reference signal is greater than the second reference signal and (2) a second value when the first reference signal is less than the second reference signal.

Example 16—The method of Examples 11, 12, 13, 14 or 15, wherein generating the position signal comprises generating the position signal based on first position data and second position data.

Example 17—The method of Example 16, wherein generating the position signal further comprises generating the first position data and the second position data.

Example 18—The method of Example 17, wherein (1) generating the first position data comprises generating first gray code and (2) generating the second position data comprises generating second gray code.

Example 19—The method of Examples 11, 12, 13, 14, 15, 16, 17 or 18, wherein performing the logic operation comprises performing an exclusive or logic operation.

Example 20—The method of Examples 11, 12, 13, 14, 15, 16, 17, 18 or 19, further comprising determining if first position data associated with the position signal is equal in value to second position data associated with the position signal.

Although the various aspects of the DRPI system 100 and the method 200 have been described herein in connection with certain disclosed aspects, many modifications and variations to those aspects may be implemented. Also, where materials are disclosed for certain components, other materials may be used. Further more, according to various aspects, a single component may be replaced by multiple components, and multiple components may be replaced by a single component, to perform a given function or functions. The foregoing description and the appended claims are intended to cover all such modifications and variations as falling within the scope of the disclosed aspects.

While this invention has been described as having exemplary designs, the described invention may be further modified within the spirit and scope of the disclosure. This application is therefore intended to cover any variations, uses, or adaptations of the invention using its general principles. For example, although the invention was described in the context of a DRPI system 100, the general principles of the invention are equally applicable to any type of "step" system. Similarly, although the invention was also described in the context of a nuclear power plant, the general principles of the invention are also equally applicable to applications other than nuclear power plants.

Any patent, patent application, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A rod position indication system, comprising:
a first set of coils and a second set of coils disposed in an alternating arrangement;
a first data encoder unit connected to each of the first set of coils, wherein the first data encoder unit is configured to generate a first reference signal and first position data;
a second data encoder unit connected to the each of the second set of coils, wherein the second data encoder unit is configured to generate a second reference signal and second position data; and
a processing circuit in signal communication with the first and second data encoder units, where the processing circuit is configured to:
generate a logic comparison of the first and second reference signals;
generate a logic signal based on the first position data and the second position data; and
perform a logic operation on the logic signal and a result of the logic comparison.

2. The rod position indication system of claim 1, wherein the first data encoder unit is further configured determine which adjacent pair of the first set of coils has a largest difference of respective voltages across them.

3. The rod position indication system of claim 2, wherein the first reference signal is a rectification of the largest difference of respective voltages associated with the first set of coils.

4. The rod position indication system of claim 1, wherein the second data encoder unit is further configured determine which adjacent pair of the second set of coils has a largest difference of respective voltages across them.

5. The rod position indication system of claim 4, wherein the second reference signal is a rectification of the largest difference of respective voltages associated with the second set of coils.

6. The rod position indication system of claim 1, wherein the processing circuit is further configured to generate a result of the logic comparison, wherein the result comprises:
    a first value when the first reference signal is greater than the second reference signal; and
    a second value when the first reference signal is less than the second reference signal.

7. The rod position indication system of claim 1, wherein the processing circuit is further configured to generate a result of the logic operation, wherein the result comprises a representation of a position of a rod with 3-step accuracy.

8. The rod position indication system of claim 1, wherein the first set of coils and the second set of coils are disposed around a drive rod, wherein the first position data and the first reference signal are representative of different characteristics of a position of a tip of the drive rod and wherein the second position data and the second reference signal are representative of different characteristics of the position of the tip of the drive rod.

9. The rod position indication system of claim 1, wherein the first set of coils and the second set of coils are disposed around a drive rod, wherein the first position data is representative a position of a tip of the drive rod between a pair of adjacent first coils, and wherein the second position data is representative the position of the tip of the drive rod between a pair of adjacent second coils.

10. The rod position indication system of claim 1, wherein the first set of coils and the second set of coils are disposed around a drive rod, wherein the first reference signal is representative of a position of a tip of the drive rod between a first coil of the first set of coils and a second coil of the second set of coils, and wherein the second reference signal is representative of the position of the tip of drive rod between a first coil of the first set of coils and a second coil of the second set of coils.

11. The rod position indication system of claim 1, wherein the first set of coils and the second set of coils are disposed around a drive rod, wherein the result of the logic signal is representative of a position of a tip of the drive rod as one of: closer to a coil of the first set of coils, equidistant from a coil of the first set of coils or a coil of the second set of coils, or closer to a coil of the second set of coils.

12. The rod position indication system of claim 1, wherein the first set of coils and the second set of coils are disposed around a drive rod, wherein the logic signal is representative of a position of a tip of the drive rod relative to a coil of the first set of coils and a coil of the second set of coils.

13. The rod position indication system of claim 12, wherein the result of the logic operation comprises the position of the drive rod, wherein the position of the drive rod is between a first coil of the first set of coils and a second coil of the second set of coils and whether it is closer to either the first coil or the second coil or equidistant from the first and second coil.

14. A method, comprising:
    generating first position data and second position data;
    generating a first reference signal and a second reference signal;
    performing a logic comparison of the first and second reference signals;
    generating a position signal based on the first position data and the second position data; and
    performing a logic operation on the position signal and a result of the logic comparison, wherein a result of the logic operation a representation of a position of a rod with 3-step accuracy.

15. The method of claim 14, wherein generating the first and second reference signal comprises:
    measuring respective voltages across individual first coils; and
    measuring respective voltages across individual second coils, wherein the first set of coils and the second set of coils are disposed around a drive rod travel housing in an alternating arrangement.

16. The method of claim 14, wherein generating the first and second reference signals comprises:
    determining which adjacent pair of first coils has a largest difference of respective voltages across them; and
    determining which adjacent pair of second coils has a largest difference of respective voltages across them, wherein the first coils and the second coils are disposed around a drive rod travel housing in an alternating arrangement.

17. The method of claim 16, wherein generating the first and second reference signals further comprises:
    rectifying the largest difference of respective voltages associated with the first coils; and
    rectifying the largest difference of respective voltages associated with the second coils.

18. The method of claim 14, further comprising generating a result of the logic comparison, wherein the result of the logic comparison comprises:
    a first value when the first reference signal is greater than the second reference signal; and
    a second value when the first reference signal is less than the second reference signal.

19. The method of claim 14, wherein:
    generating the first position data comprises generating first gray code; and
    generating the second position data comprises generating second gray code.

20. The method of claim 14, further comprising determining if the first position data associated with the position signal is equal in value to the second position data associated with the position signal.

* * * * *